(12) United States Patent
Thomas et al.

(10) Patent No.: US 10,845,250 B1
(45) Date of Patent: Nov. 24, 2020

(54) BOLOMETER PIXEL TRIGGER

(71) Applicant: RAYTHEON COMPANY, Waltham, MA (US)

(72) Inventors: Matthew Thomas, Carpinteria, CA (US); Craig R. Adams, Buellton, CA (US); Ryan Boesch, Louisville, CO (US); Jamal Mustafa, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/438,831

(22) Filed: Jun. 12, 2019

(51) Int. Cl.
 *G01J 5/20* (2006.01)
 *G01J 5/22* (2006.01)
(52) U.S. Cl.
 CPC .......... *G01J 5/22* (2013.01); *G01J 2005/202* (2013.01)
(58) Field of Classification Search
 None
 See application file for complete search history.

(56) References Cited

U.S. PATENT DOCUMENTS

| | | | |
|---|---|---|---|
| 10,175,113 B2 | 1/2019 | Masini et al. | |
| 2006/0124831 A1* | 6/2006 | Schimert | H01L 27/1465 250/214 R |
| 2011/0233404 A1 | 9/2011 | Sonstroem | |
| 2011/0266445 A1 | 11/2011 | Beratan | |

OTHER PUBLICATIONS

Fukaya "Analysis of 320X240 Uncooled Microbolometer Focal Plane Array and Design of Thermoelectric Cooler Controller", New Jersey Institute of Technology, May 1997, p. 1-55. (Year: 1997) (Year: 1997).*

* cited by examiner

*Primary Examiner* — David P Porta
*Assistant Examiner* — Mamadou Faye
(74) *Attorney, Agent, or Firm* — Cantor Colburn LLP

(57) ABSTRACT

A bolometer pixel trigger array includes a substrate, an electrically conductive contact pad formed on the substrate, and bolometer formed on the substrate. The bolometer includes at least one thermally conductive trigger arm having a fixed end coupled to a portion of the bolometer and an electrically conductive free end configured to deflect with respect to the fixed end. At least one trigger arm establishes different operating states of the bolometer pixel trigger in response to the at least one trigger arm realizing different temperatures. The different operating states are configured to change an electrical connection between the at least one trigger arm and the contact pad.

20 Claims, 9 Drawing Sheets

BOLOMETER PIXEL TRIGGER

BACKGROUND

The present teachings are generally related to thermal imaging systems, and more particularly, to bolometer pixels included in thermal imaging systems.

Bolometer pixels in bolometer pixel arrays are used in a wide variety of infrared or thermal imaging applications. When they are exposed to heat sources bolometer pixels change their resistance to provide a measureable signal. However, bolometer pixels are vulnerable to excessive heat sources which can fundamentally change the mechanical properties and response of the pixel and degrade their resulting imaging capability. In addition, extreme heat sources can completely destroy the pixels.

SUMMARY

Embodiments of the present invention are directed to a bolometer pixel trigger array includes a substrate, an electrically conductive contact pad formed on the substrate, and bolometer formed on the substrate. The bolometer includes at least one thermally conductive trigger arm having a fixed end coupled to a portion of the bolometer and an electrically conductive free end configured to deflect with respect to the fixed end. At least one trigger arm establishes different operating states of the bolometer pixel trigger in response to the at least one trigger arm realizing different temperatures. The different operating states are configured to change an electrical connection between the at least one trigger arm and the contact pad.

Embodiments of the present invention are directed to a readout integrated circuit (ROIC) comprising a plurality of pixel triggers, each pixel trigger configured to selectively operate in a normal position and a tripped position based on a temperature of the pixel trigger. An overheating condition detector circuit is in signal communication with the plurality of pixel triggers. The overheating condition detector circuit is configured to detect at least one overheated pixel trigger among the plurality of pixel triggers in response to the at least one overheated pixel trigger operating in the tripped position.

Embodiments of the invention are directed to a method of detecting at least one overheated pixel trigger among a plurality of pixel triggers. The method comprises exposing a plurality of pixel triggers to a first temperature to initiate a normal operating state of each pixel trigger among the plurality of pixel triggers, and invoking a tripped operating state of at least one overheated pixel trigger among the plurality of pixel triggers in response to a temperature of the at least one overheated pixel trigger exceeding a temperature threshold. The method further comprises detecting, via an overheating condition detector circuit, the at least one overheated pixel trigger among the plurality of pixel triggers in response to invoking the tripped operating state of the at least one overheated pixel trigger.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
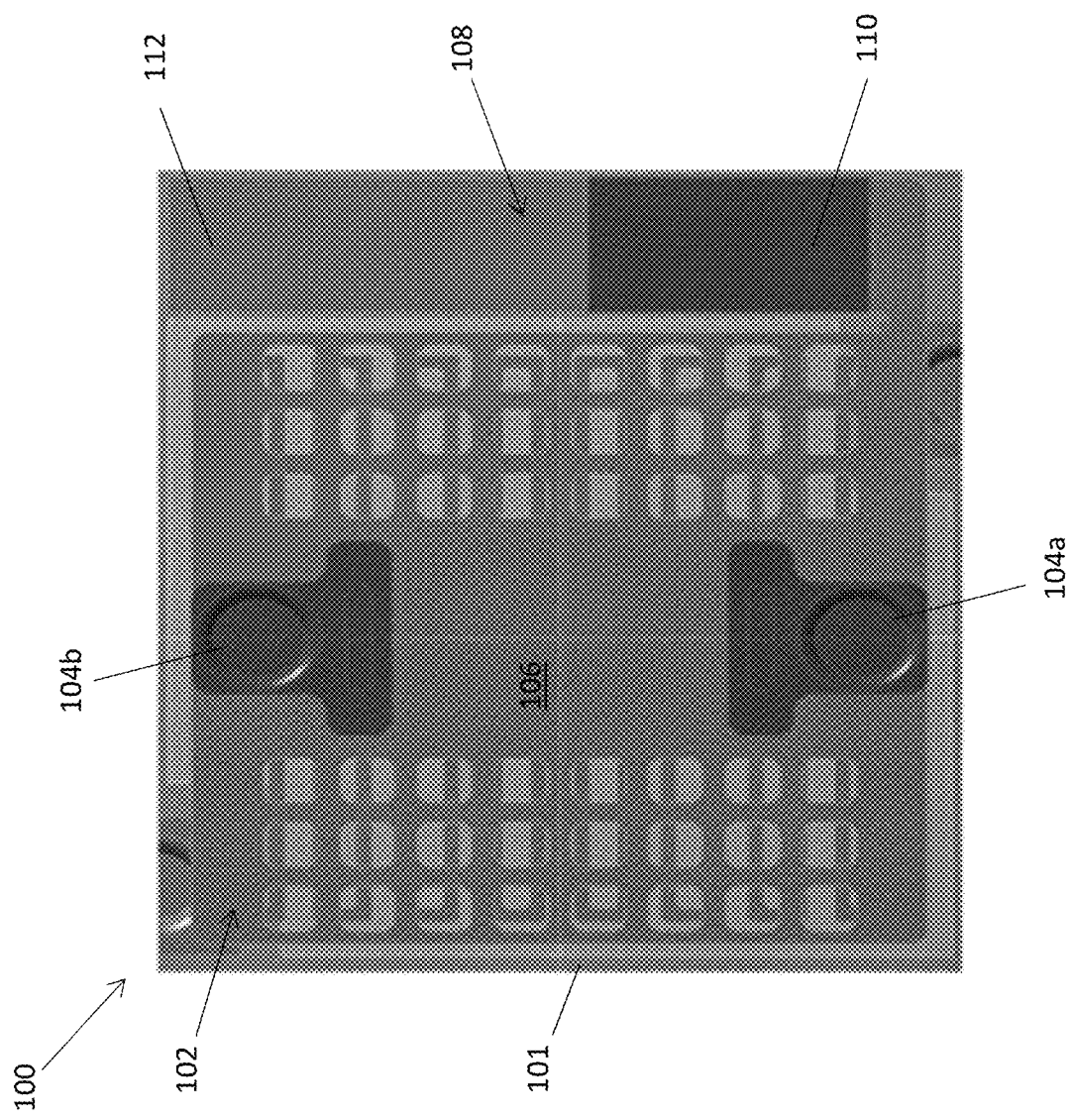
FIG. 1 is a top view of a bolometer pixel trigger according to a non-limiting embodiment.

The diagrams depicted herein are illustrative. There can be many variations to the diagrams or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, thermal shorts, mechanical shutters and thermochromic switches have been modeled and employed in thermal imaging systems to protect bolometer pixels from damage caused by excessive heat produced by potentially damaging laser or solar radiation. However, the aforementioned conventional protection methods have limitations in terms of how much heat can be conducted away from pixels (via thermal short) when exposed to lasers or solar radiation or how much laser or solar radiation can be blocked from reaching the pixels by the shutter and thermochromic switch (e.g., phase change VOx). Furthermore the thermal short, mechanical shutter and thermochromic switch all impart reductions on the normal bolometer performance (when not exposed to laser or solar radiation) due to either reduced fill factor or reduced transmission of infrared light to the bolometer pixels.

One or more embodiments of the invention address the above-described shortcomings of the prior art by providing a bolometer pixel-based thermally actuated trigger (hereinafter referred to as a bolometer pixel trigger). The bolometer pixel trigger which operates together with a trigger sense circuit located on the readout integrated circuit (ROIC) to detect excessive thermal energy delivered to the trigger switch. The bolometer pixel trigger can be tripped in response to realizing excessive heat, which in turn trips the trigger sense circuit to output a pixel protection control signal that can invoke a thermal imaging protection operation. The protection operation can include, for example, limitations in terms of how much heat can be conducted away from pixels (e.g., via a thermal short) when exposed to lasers or solar radiation or how much laser or solar radiation can be blocked from reaching the pixels by the shutter and thermochromic switch (e.g., phase change VOx).

Figure 2:
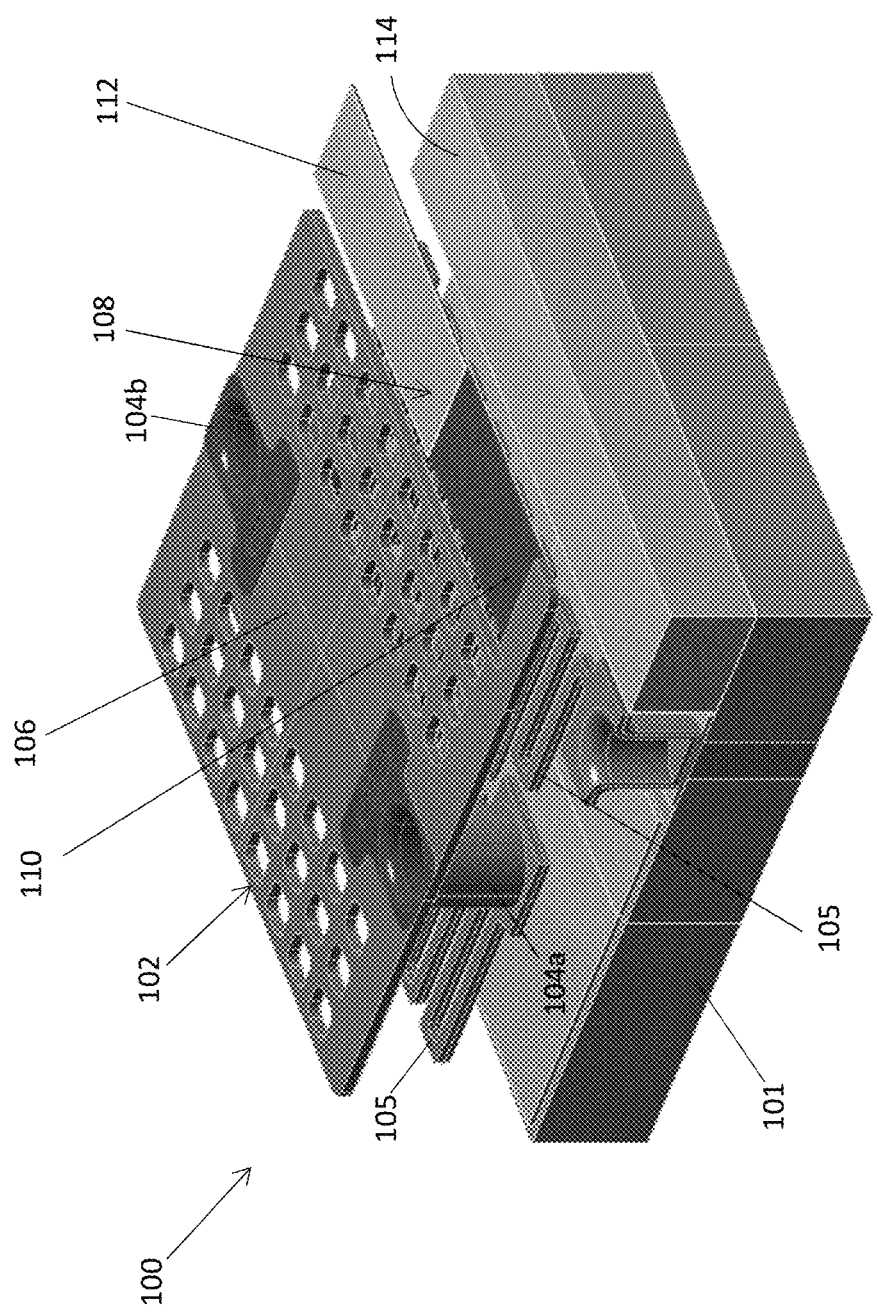
FIG. 2 is a perspective view of a bolometer pixel trigger operating in a first operating state according to a non-limiting embodiment.
Figure 3:
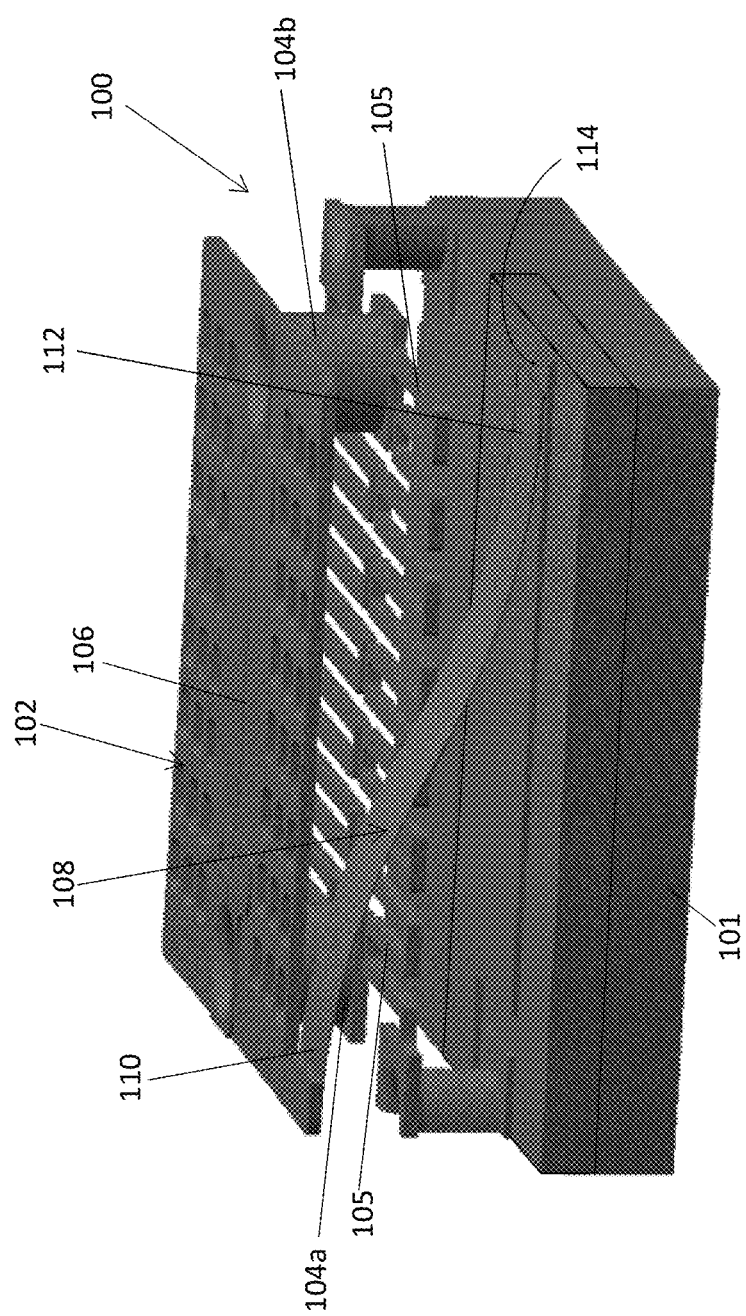
FIG. 3 is a perspective view of a bolometer pixel trigger operating in a second operating state according to a non-limiting embodiment.

Turning now to FIGS. 1, 2 and 3, a bolometer pixel trigger 100 is illustrated according to a non-limiting embodiment. The bolometer pixel trigger 100 includes a substrate 101 that supports a bolometer 102 via a pair of opposing electrically conductive contact beams 104a and 104b. The bolometer 102 includes a photosensitive region 106 (sometimes referred to as a mesa, bridge or body), which is interposed between the contact beams 104a and 104b. In some embodiments, the bolometer 102 can include one or more thermal regulator elements 105a and 105b, which regulate heat transfer between the photosensitive region 106 and the substrate 101. For example, the thermal regulating elements 105a and 105b regulate heat transfer from the mesa 102 to the substrate 101. Because the substrate temperature is typically fixed and the pixel temperature increases in response to radiation, thermal energy flows from the pixel mesa 102 to substrate 101.

The photosensitive resistive region 106 is formed from a thermistor material (e.g., amorphous silicon) having a temperature coefficient of resistance (TCR) value. The thermal resistance coefficient value provides a bolometer thermal resistance, which can be utilized to sense thermal energy delivered to the bolometer pixel trigger 100. For example, when thermal energy (e.g., infrared light) is delivered to the photosensitive resistive region 106, the resistance of the thermoelectric conversion material increases. The change in thermal resistance is converted into a voltage, which can be read out and utilized to provide a thermal sensor.

The bolometer 102 further includes a trigger arm 108. The trigger arm 108 is formed from a flexible material and includes a fixed end 110 and a free end 112. The width of the trigger arm 108 can range, for example from about 1 micrometer (μm) to about 5 μm.

The fixed end 110 is coupled to a portion (e.g., flange) of the bolometer 102 so that the free end 112 is capable of deflecting with respect to the fixed end 110. Accordingly, the trigger arm's flexible material allows the trigger arm 108 to flex and deform to achieve a first physical profile and a second physical profile different from the first profile. For example, the first physical profile can be a substantially straight and uniform profile where the trigger arm 108 is disposed parallel an upper surface of the bolometer 102, while the second physical profile is curved extending from the fixed end toward the substrate 101 such that the free end 112 physically contacts the contact pad 114. Accordingly, the trigger arm 108 can operate as a cantilever allowing it to deflect from a non-flexed position (see FIG. 2) to a flexed position (see FIG. 3), and vice versa.

In one or more embodiments, the trigger arm 108 has a bimetallic body, a bimorph body, or a trimorph body. Accordingly, a first portion of the trigger arm 108 including the fixed end 110 can be formed from a first material, while a second portion of the trigger arm 108 including the free end 112 can be formed from a second material. In one example the first material is titanium (Ti) and the second material is aluminum (Al). In another example the first material is aluminum and the second material is silicon nitride (SiN). In another example the first material is titanium and the second material is silicon nitride. It should be appreciated that materials of the trigger arm 108 are not limited to using titanium, aluminum, or silicon nitride, and other materials may be selected.

When the second portion of the trigger arm 108 including the free end 112 is formed from a flexible non-metal material (e.g., SiN), an electrically conductive layer (not shown in FIGS. 1, 2 and 3) can be deposited on the trigger arm 108, and extended to contact the first portion including the fixed end 110 (formed from a metal material, e.g., Al). Accordingly, the free end 112 of the trigger arm 108 can still establish an electrical connection when the free end 112 contacts the contact pad 114.

In any case, the materials of the trigger arm 108 can be selected such that the trigger arm 108 deflects in response to being heated above a threshold temperature (e.g., 250 degrees Celsius. Accordingly, when the temperature of the trigger arm 108 is at or below the threshold temperature, the trigger arm 108 remains in a biased, non-flexed or partially-flexed open position (see FIG. 2) with the bolometer pixel trigger 100 in a first operating state. When, however, the temperature of the trigger arm 108 exceeds the threshold temperature, the trigger arm 108 deflects from the biased non-flexed or partially-flexed position into a fully-flexed position, thereby physically contacting an electrically conductive contact pad 114 to achieve a closed position (see FIG. 3) such that the bolometer pixel trigger 100 changes to a second operating state. The contact pad 114 can be electrically connected to a ROIC (not shown in FIGS. 1, 2 and 3), which detects the electrical contact between the trigger arm 108 and the contact pad 114. Accordingly, the bolometer pixel trigger 100 can operate as a thermal switch, which is activated in response to contacting the free end 112 to the contact pad 114. When the trigger arm 108 cools such that its temperature falls below the temperature threshold, the trigger arm 108 returns to the biased non-flexed position.

Although the operation of the bolometer pixel trigger 100 is described in terms of a biased non-flexed trigger arm example, the bolometer pixel trigger 100 can operate in similar manner where the trigger arm 108 is biased in the flexed position (see FIG. 3). Accordingly, the bolometer pixel trigger 100 can be activated when trigger arm 108 deflects into the non-flexed position (see FIG. 2), effectively achieving an open position to activate the thermal switch.

Figure 4:
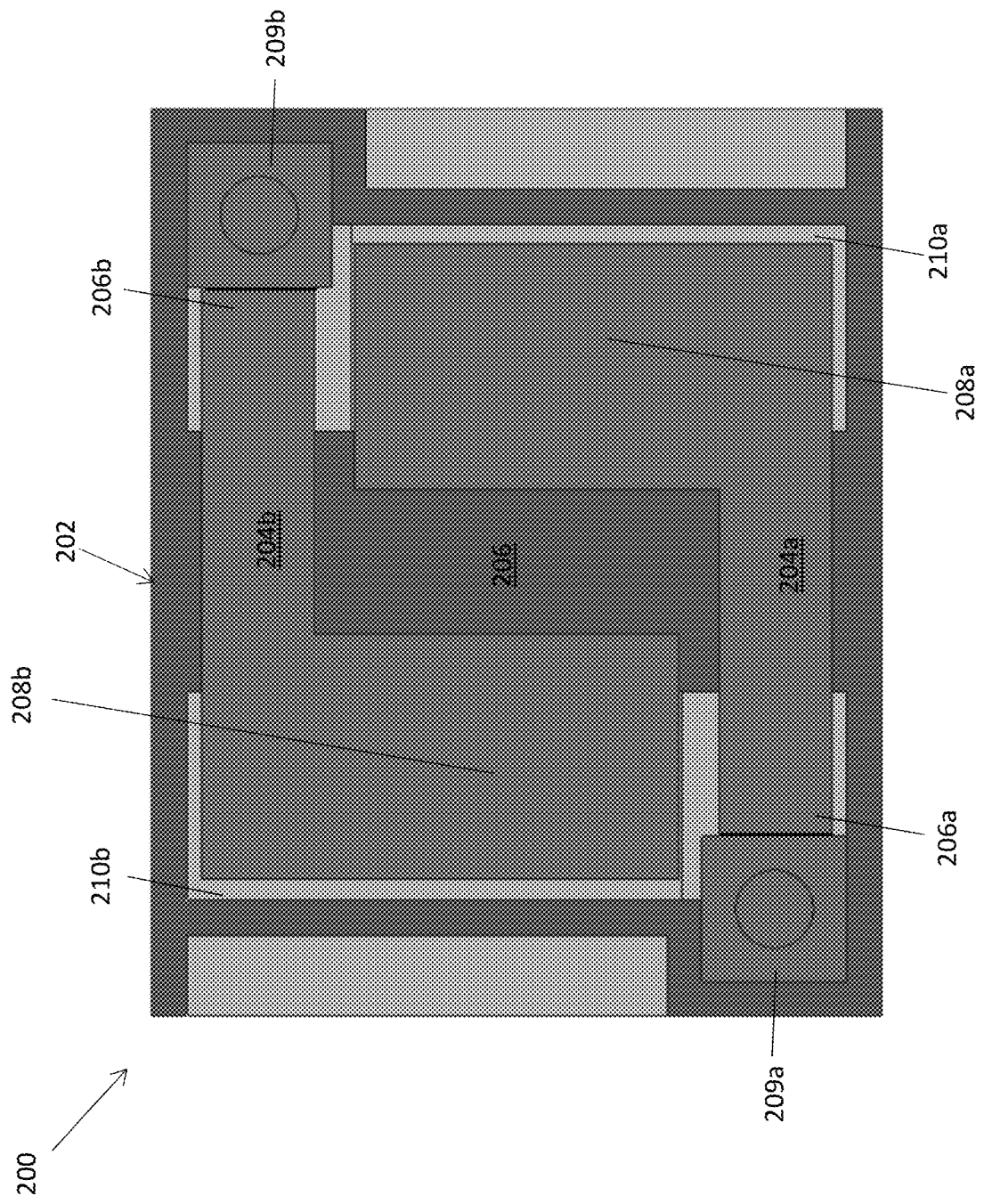
FIG. 4 is a top view of a bolometer pixel trigger according to another non-limiting embodiment.
Figure 5:
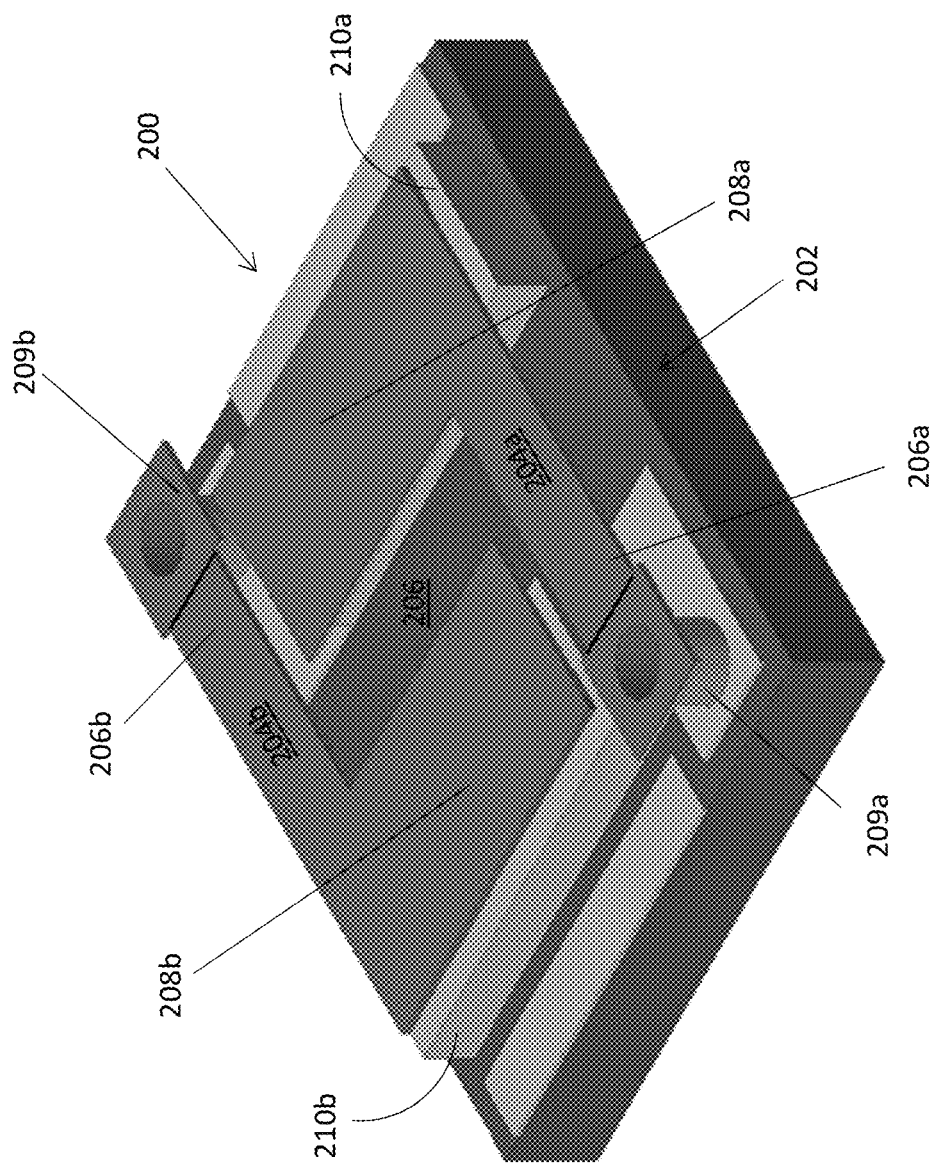
FIG. 5 is a perspective view of the bolometer pixel trigger shown in FIG. 4 according to a non-limiting embodiment.
Figure 6:
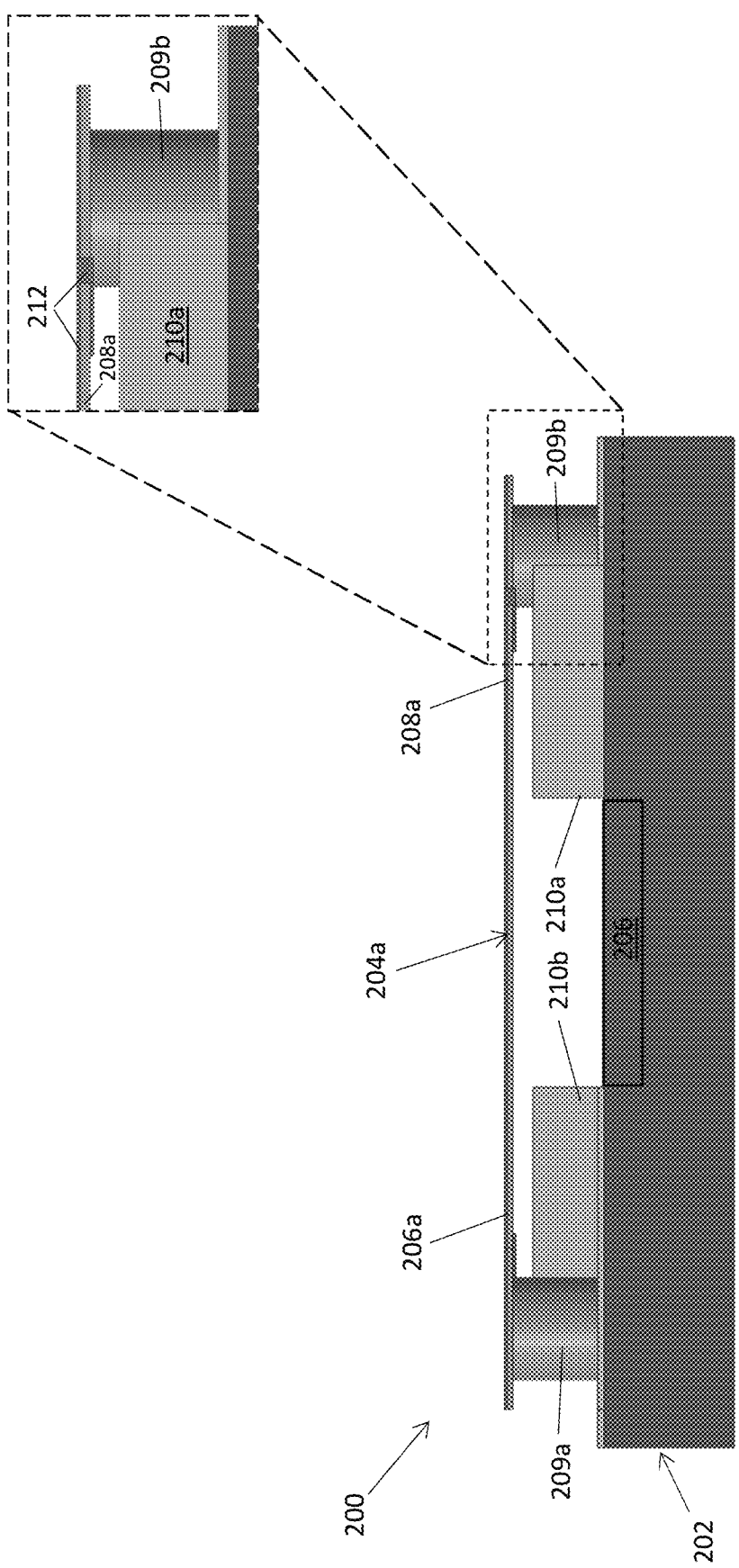
FIG. 6 is a perspective view of the bolometer pixel trigger shown in FIG. 4 according to a non-limiting embodiment.

Turning to FIGS. 4, 5 and 6, a dual trigger arm bolometer pixel 200 is illustrated according to a non-limiting embodiment. The dual-trigger arm bolometer pixel 200 includes a bolometer 202, a first trigger arm 204a and a second trigger arm 204b. The bolometer 202 includes a photosensitive region 206, and operates similar to the bolometer 102 described in detail above with respect to FIGS. 1, 2 and 3. In other embodiments, the photosensitive region 206 can be omitted such that the dual trigger arm bolometer pixel 200 is used primarily as a thermal energy detector as opposed to the bolometer pixel trigger 100 described above, which can operate as both imaging pixel and a thermal energy detector.

In either embodiment, the first trigger arm 204a includes a first fixed end 206a and a first free end 208a. Similarly, the second trigger arm 204b has a second fixed end 206b and a second free end 208b. The first trigger arm 204a is configured to deflect to and from a non-flexed position and flexed position. According, the first trigger arm 204a can establish a closed switch position when the free end 208a contacts a corresponding first contact pad 210a. Similarly, the second trigger arm 204b can establish a closed switch position when its free end 208b contacts a corresponding second contact pad 210b.

As shown in FIG. 6, when the second portion of the trigger arms (e.g., the first trigger arm 204a) including the free end 208a is formed from silicon nitride, an electrically conductive layer 212 can be deposited on the trigger arm 204a, and extended to contact the fixed portion (e.g., formed from a metal material) of the trigger arm 204a. Accordingly, the second portion (i.e., free end portion) of the trigger arm 204a can be formed from a flexible non-conductive material (e.g., silicon nitride), while still establishing an electrical connection between the contact beam 209a and the contact pad 210 when the free end 208a contacts the contact pad 210a.

A plurality of bolometer pixel triggers 100 and/or a plurality of dual trigger arm bolometer pixels 200 can be implemented in a bolometer array (not shown), which is then installed in a thermal imaging system (not shown). In at least one embodiment, a bolometer pixel trigger 100 is utilized for each pixel (i.e., per pixel) included in the bolometer array. Accordingly, excessive thermal energy levels directed at the bolometer array can be detected by any one of the bolometer pixel triggers 100 that are heated above its temperature threshold.

In other embodiments, a sparse number of dual trigger arm bolometer pixels 200 are dispersed among a plurality of conventional bolometers pixels. This embodiment operates similar to the per-pixel embodiment described above except the sparse approach incorporates either a select number of bolometer pixel triggers 100 and/or a select number of dual trigger arm bolometer pixels 200 dedicated to thermal actuation rather than IR image collection. Dedicating the dual trigger arm bolometer pixels 200 to thermal actuation allows for omitting the photosensitive region 106, which in turn allows for providing larger trigger arms and/or different trigger arm geometries which can improve thermal sensitivity and ensure trigger actuation when heated.

Figure 7:
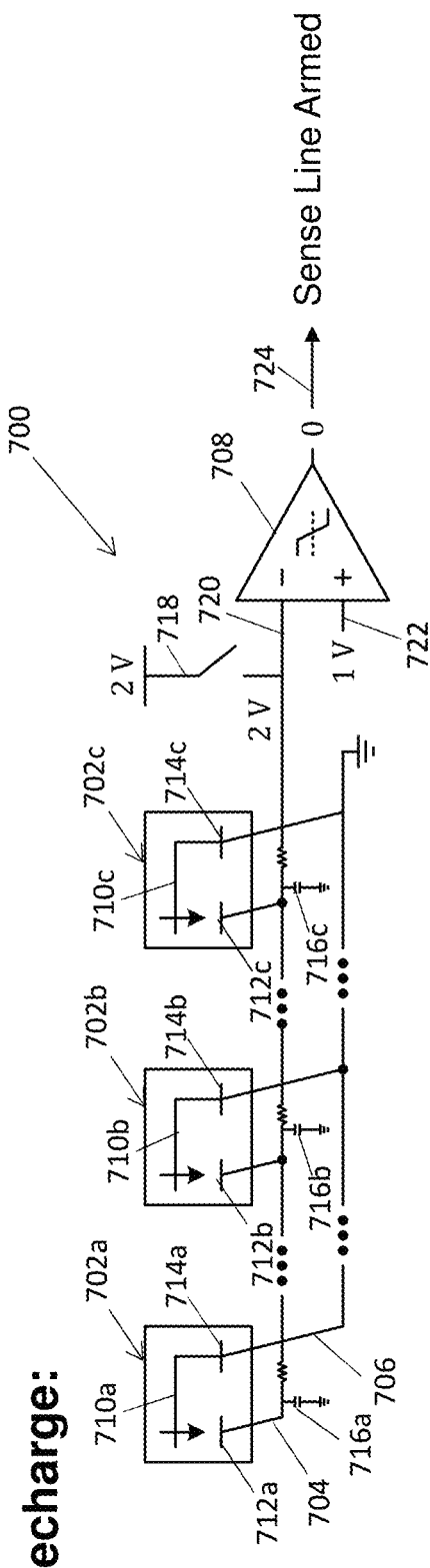
FIG. 7 is a schematic diagram of a trigger sense circuit located on a readout integrated circuit (ROIC) used in conjunction with a bolometer pixel trigger and operating in a precharged stage according to a non-limiting embodiment.

Turning now to FIG. 7, a trigger sense circuit 700 capable of detecting the operating state of a bolometer pixel trigger or a dual trigger arm bolometer pixel is illustrated according to a non-limiting embodiment. The trigger sense circuit 700 includes one or more pixel triggers 702a, 702b, 702c, a trigger sense signal line 704, a reference signal line 706, and an electronic comparator 708. The combination of the trigger sense signal line 704, reference signal line 706, and electronic comparator 708 provides one example of a pixel trigger overheating condition detector circuit capable of detecting whether one or more of the pixel triggers 702a, 702b, 702c has become overheated due to exposure to an excessive amount of thermal energy (e.g., solar radiation, laser energy, etc.).

The pixel triggers 702a, 702b, 702c can be constructed as a bolometer pixel trigger 100 or a dual trigger arm bolometer pixel 200 as described herein. In either scenario, each pixel trigger 702a, 702b, 702c includes a trigger arm 710a, 710b, 710c capable of deflecting from a first or normal position into a second or tripped position in response to being heated above a temperature threshold to establish electrical contact with a contact terminal 712a, 712b, 712c.

The trigger sense signal line 704 is connected to the contact terminal 712a, 712b, 712c of each pixel trigger 702a, 702b, 702c. The ground reference signal line 706 is connected to a ground terminal 714a, 714b, 714c included with each pixel trigger 702a, 702b, 702c. The trigger sense signal line 704 further includes one or more energy storage devices 716a, 716b, 716c connected thereto. The energy storage devices 716a, 716b, 716c can be a capacitor (e.g., the capacitance of the sense line), for example, and are configured to store an electrical charge in response to selectively applying precharge voltage 718 (e.g., 2V) to the trigger sense signal line 704. After applying the precharge voltage 718 and charging the energy storage devices 716a, 716b, 716c, the trigger sense signal line 704 can be referred to as being "armed". When armed, the comparator 708 realizes a precharge voltage 718 (e.g., 2V) at a first input terminal 720. The precharge voltage 718 can then be compared to the reference voltage (e.g., 1V) applied to the second input terminal 722. When the voltage at the first terminal 720 is greater than the voltage at second input terminal 722, for example, the comparator 708 outputs a trigger detection signal 724 (e.g., a binary 0 or binary 1) having a first electrical state (e.g., approximately 0V). The first detection signal 724 indicates that the precharge voltage 718 remain intact rather than discharged. Accordingly, the ROIC 700 indicates that the pixel triggers 702a, 702b, 702c remain in their normal operating states and have not been tripped by excessive heat.

Figure 8:
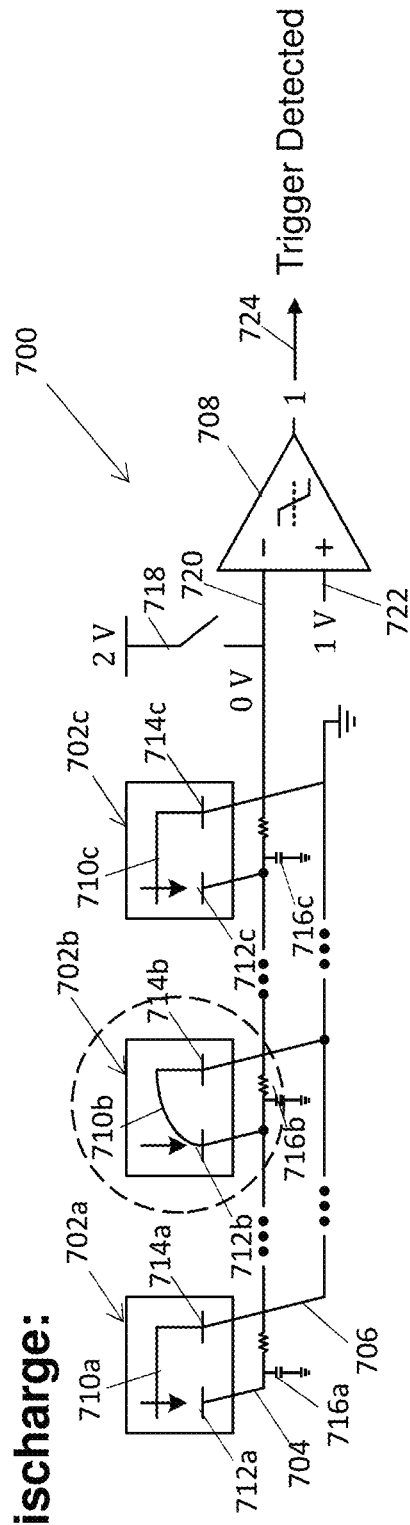
FIG. 8 is a schematic diagram of the trigger sense circuit shown in FIG. 7 operating in a discharged stage according to a non-limiting embodiment.

Referring to FIG. 8, the ROIC 700 is shown in a discharged operating state after thermal energy overheats pixel trigger 702b causing its trigger arm 710b to move into a "closed" position and contact the contact terminal 712b.

Contacting the trigger arm 710b with the contact terminal 712b establishes a short circuit connection between the trigger sense signal line 704 and the ground reference signal line 706, thereby causing the energy storage devices 716a, 716b, 716c to discharge their precharge voltages. The voltage on the first input terminal 720 therefore drops below the reference voltage on the second input terminal 722. Accordingly, the comparator 708 outputs the trigger detection signal 724 having a second electrical state (e.g., approximately 1V) and indicates that at least one of the pixel triggers 702a, 702b, 702c (in this example, pixel trigger 702b) has been tripped due to excessive heat. In one or more embodiments, a main controller (not shown) can monitor the trigger sense circuits 700 and determine which of the pixel triggers 702a, 702b, 702c, etc. have tripped. In this manner, the controller can determine the area(s) of the bolometer array experiencing the excessive heat, and in turn can determine the direction(s) and general location(s) of the thermal heat source(s) delivering the excessive heat.

Figure 9:
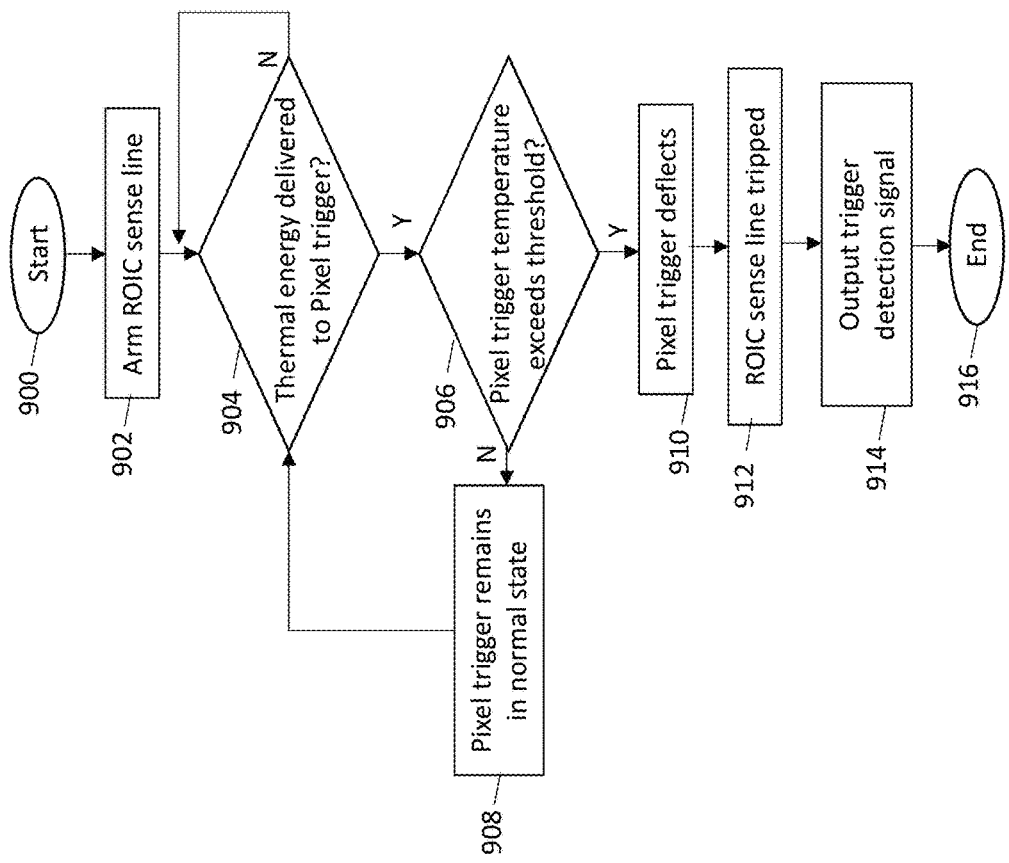
FIG. 9 is a flow diagram illustrating a method of detecting thermal energy delivered to a bolometer pixel trigger according to a non-limiting embodiment.

Turning now to FIG. 9, a method of detecting thermal energy delivered to a bolometer pixel trigger is illustrated according to a non-limiting embodiment. Also referencing FIGS. 7 and 8, the method begins at operation 900, and at operation 902 the ROIC 700 is armed by applying a precharge voltage 718 to a trigger sense signal line 704 that is connected to a plurality of pixel triggers 702a, 702b, 702c. At operation 904, thermal energy delivered to one or more of the pixel triggers 702a, 702b, 702c is monitored based on the electrical state of a trigger detection signal 724 output by a comparator 708 included in the ROIC 700. As described above, the comparator 708 compares the voltage applied to the first input terminal 720 of the comparator 708 via the trigger sense signal line 704 with a reference voltage applied to a second input terminal 722 of the comparator 708. When no thermal energy is received by the pixel triggers 702a, 702b, 702c, the method returns to operation 904 and continues monitoring for thermal energy.

When, however, thermal energy is received by one or more of the pixel triggers 702a, 702b, 702c, the method determines at operation 906 whether the received thermal energy causes the temperature of one or more of the pixel triggers 702a, 702b, 702c to exceed a temperature threshold. When the temperature of a given pixel trigger 702a, 702b, 702c does not exceed the temperature threshold, the pixel trigger 702a, 702b, 702c either does not deflect or does not deflect enough to make contact with the electrically conductive contact pad 114 such that it remains in its normal operating state at operation 908, and the method returns to operation 904 to continue monitoring the delivery of thermal energy.

When, however, the temperature of one or more pixel triggers 702a, 702b, 702c exceeds the temperature threshold, one or more associated trigger arms 710a, 710b, 710c of the pixel triggers 702a, 702b, 702c deflects to a second position at operation 910 and the ROIC 700 is tripped at operation 912. Accordingly, the comparator 708 included in the ROIC 700 outputs a trigger detection signal 724 at a second electrical state at operation 914 indicating that at least one of the pixel triggers 702a, 702b, 702c is receiving an excessive amount heat, and the method ends at operation 916.

Figure 10:
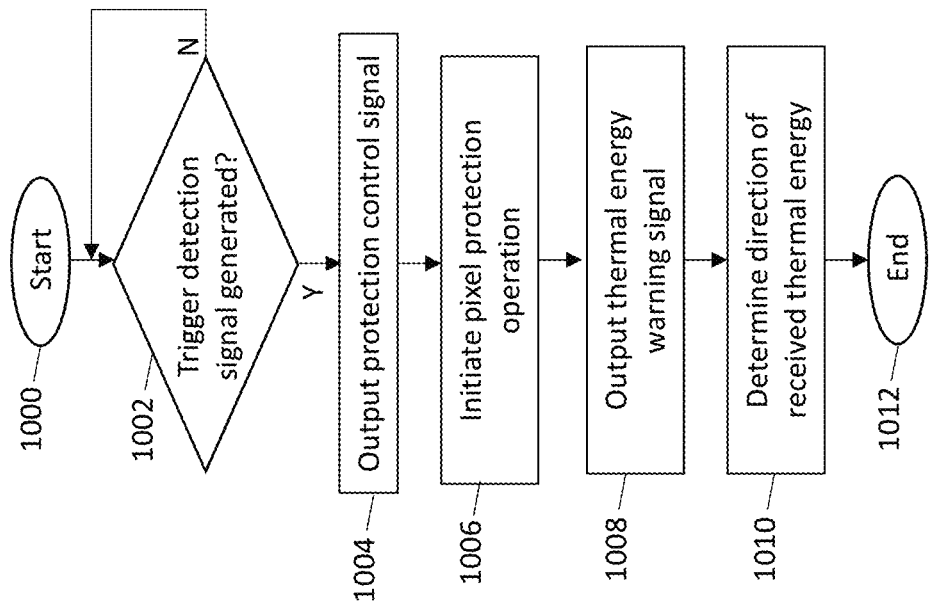
FIG. 10 is a flow diagram illustrating a method of protecting bolometer pixels in a thermal imaging system according to a non-limiting embodiment.

Turning to FIG. 10, a method illustrates that a trigger detection signal output by the ROIC can be utilized to perform a protection operation to protect bolometer pixels in a thermal imaging system. Also referencing FIGS. 7 and 8, the method begins at operation 1000, and at operation 1002 a determination is made as to whether the ROIC 700 outputs a trigger detection signal 724 at a second electrical state indicating that one or more of the pixel triggers 702a, 702b, 702c (e.g., bolometer pixel triggers or dual trigger arm bolometer pixels) included in a thermal imaging system is receiving an excessive amount of heat. When the trigger detection signal 724 having the second electrical state is not output from the ROIC 700 (i.e., when the trigger detection signal 724 has a first electrical state), the method returns to operation 1002 and continues monitoring for the trigger detection signal 724 at the second electrical state.

When, however, the trigger detection signal 724 at the second electrical state is detected, a separate controller (not shown) outputs a protection control signal at operation 1004, and a protection operation is initiated at operation 1006 to protect the bolometer pixels in the thermal imaging system. The protection operation can include, but is not limited to, a mechanical shutter or voltage-controlled window in front of a bolometer pixel array that block or reduce the excessive energy delivered to the over-heated pixel(s). At operation 1008, an excessive thermal warning signal can be output (e.g., via an imaging system controller) at operation 1008, and the direction and/or location of the thermal energy source can be determined (via the imaging system controller) at operation 1010 before the method ends at operation 1012.

Various embodiments described herein provides a pixel trigger constructed as a bolometer pixel triggers 100 and/or a plurality of dual trigger arm bolometer pixels 200, which can be implemented in a bolometer pixel array of an thermal imaging system. The pixel trigger includes a thermally actuated trigger arm, which operates together with a trigger sense circuit located on a readout integrated circuit (ROIC) to detect excessive thermal energy delivered to the trigger switch. The bolometer pixel trigger can be tripped in response to realizing excessive heat, which in turn trips the ROIC to output a pixel protection control signal that can invoke a thermal imaging protection operation. The protection operation can include, for example, a shutter or voltage-controlled window that block or reduce the amount of laser or solar radiation reaching the bolometer pixels.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A bolometer pixel trigger array comprising:
   a substrate;
   an electrically conductive contact pad formed on the substrate; and
   a bolometer formed on the substrate, the bolometer including at least one thermally conductive trigger arm including a fixed end coupled to a portion of the bolometer and an electrically conductive free end configured to deflect with respect to the fixed end,
   wherein the at least one trigger arm establishes different operating states of the bolometer pixel trigger in response to the at least one trigger arm realizing different temperatures, the different operating states configured to change an electrical connection between the at least one trigger arm and the contact pad.

2. The bolometer pixel trigger of claim 1, wherein the at least one trigger arm establishes a first operating state when the at least one trigger arm has a first temperature that is at or below a threshold temperature value, and establishes a second operating state when the at least one trigger arm has a second temperature that exceeds the threshold temperature value.

3. The bolometer pixel trigger of claim 2, wherein the at least one trigger arm establishes the first operating state when the free end is spaced apart from the contact pad to and establishes the second electrical state when the free end contacts the contact pad.

4. The bolometer pixel trigger of claim 2, wherein the at least one trigger arm establishes the first operating state when the free end contacts the contact pad, and establishes the second operating state when the free end is spaced apart from the contact pad.

5. The bolometer pixel trigger of claim 2, wherein the at least one trigger arm includes a bimetallic body, the bimetallic body comprising a first portion of the at least one trigger arm including the fixed end being formed from a first material, and second portion of the at least one trigger arm including the free end being formed from a second material different from the first material.

6. The bolometer pixel trigger of claim 5, wherein the at least one trigger arm includes a first trigger arm comprising a first fixed end coupled to a first electrically conductive contact and a first free end configured to selectively contact a first contact pad formed on the substrate, and a second trigger arm comprising a second fixed end coupled to a second electrically conductive contact and a second free end configured to selectively contact a second contact pad formed on the substrate.

7. The bolometer pixel trigger of claim 6, wherein the second contact pad is separated from the first contact pad.

8. A readout integrated circuit (ROIC) comprising:
a plurality of pixel triggers, each pixel trigger configured to selectively operate in a normal position and a tripped position based on a temperature of the pixel trigger; and
an overheating condition detector circuit in signal communication with the plurality of pixel triggers, the overheating condition detector circuit configured to detect at least one overheated pixel trigger among the plurality of pixel triggers in response to the at least one overheated pixel trigger operating in the tripped position.

9. The ROIC of claim 8, wherein the ROIC outputs a trigger detection signal that initiates a protection operation to protect the at least one overheated pixel trigger in response to detecting the at least one overheated pixel trigger.

10. The ROIC of claim 9, wherein the protection operation reduces the temperature of the at least one overheated pixel.

11. The ROIC of claim 10, wherein each pixel trigger among the plurality of pixel triggers comprises a ground terminal, a contact terminal, and a moveable trigger arm configured to selectively contact the contact terminal or pad.

12. The ROIC of claim 11, wherein each pixel trigger establishes the tripped position when the trigger arm is in contact with the contact terminal or pad.

13. The ROIC of claim 11, wherein each pixel trigger establishes the non-tripped position when the trigger arm is separated from the contact terminal or pad.

14. The ROIC of claim 11, wherein the overheating condition detector circuit further comprises:
a trigger sense signal line electrically connected to the contact terminal of each pixel trigger among the plurality of pixel triggers;
a ground reference signal line connected to a ground potential, the ground reference signal line connected to the ground terminal of each pixel trigger among the plurality of pixel triggers; and
a comparator including a first input terminal connected to the trigger sense signal line and a second input terminal connected to the ground reference signal line, the comparator configured to detect the at least one overheated pixel trigger based on a comparison between a first voltage of the trigger sense signal line and a second voltage of the ground reference signal line.

15. A method of detecting at least one overheated pixel trigger among a plurality of pixel triggers, the method comprising:
exposing a plurality of pixel triggers to a first temperature to initiate a normal operating state of each pixel trigger among the plurality of pixel triggers; and
invoking a tripped operating state of at least one overheated pixel trigger among the plurality of pixel triggers in response to a temperature of the at least one overheated pixel trigger exceeding a temperature threshold; and
detecting, via an overheating condition detector circuit, the at least one overheated pixel trigger among the plurality of pixel triggers in response to invoking the tripped operating state of the at least one overheated pixel trigger.

16. The method of claim 15, wherein establishing the tripped position comprises sensing that a trigger arm of the at least one overheated pixel trigger changes its position to contact a contact terminal.

17. The method of claim 15, wherein establishing the non-tripped position comprises sensing that the trigger arm of the at least one non-overheated pixel trigger changes its position to separate from a contact terminal.

18. The method of claim 15, further comprising:
outputting, via the ROIC, a trigger detection signal response to detecting the at least one overheated pixel trigger; and
initiating a protection operation to protect the at least one overheated pixel trigger in response to outputting the trigger detection signal.

19. The method of claim 18, further comprising reducing the temperature of the at least one overheated pixel in response to initiating the protection operation.

20. The method of claim 19, further comprising determining a direction of thermal energy directed toward the plurality of pixel triggers based on a location of the overheated pixel trigger among the plurality of pixel triggers.

* * * * *